United States Patent [19]
O'Connor et al.

[11] 3,739,646
[45] June 19, 1973

[54] FAILURE DETECTION AND CONTROL MEANS FOR IMPROVED DRIFT PERFORMANCE OF A GIMBALLED PLATFORM SYSTEM

[75] Inventors: Bernard J. O'Connor, Eastchester, N.Y.; Frank S. De Carlo, Westwood, N.J.

[73] Assignee: The Bendix Corporation, Teterboro, N.J.

[22] Filed: Feb. 12, 1971

[21] Appl. No.: 114,772

[52] U.S. Cl. .................................. 74/5.34, 244/79
[51] Int. Cl. ............................................ G01c 19/02
[58] Field of Search .......................... 244/15 A, 79; 74/5.34

[56] References Cited
UNITED STATES PATENTS

| | | | |
|---|---|---|---|
| 3,517,563 | 6/1970 | Will, Jr. .............................. | 74/5.34 |
| 3,489,004 | 1/1970 | Barnhill et al. .................. | 74/5.34 X |
| 3,310,986 | 3/1967 | Baecher ............................. | 74/5.34 |
| 3,308,670 | 3/1967 | Granqvist ........................... | 74/5.34 |
| 3,282,119 | 11/1966 | Shaw, Jr. et al. .................... | 74/5.34 |

Primary Examiner—Manuel A. Antonakas
Attorney—Anthony F. Cuoco and Plante, Hartz, Smith & Thompson

[57] ABSTRACT

Apparatus for detecting excessive drift of one or more gyros in a gimballed platform system and for controlling the system to maintain desired accuracy by applying torquing signals to the gyros proportional to the angular misalignment of platform inner gimbal references.

10 Claims, 3 Drawing Figures

INVENTORS:
BERNARD J. O'CONNOR
FRANK S. DE CARLO

ATTORNEY

PLATFORM 1

PLATFORM 2

INVENTORS:
BERNARD J. O'CONNOR
FRANK S. DE CARLO

3,739,646

FAILURE DETECTION AND CONTROL MEANS FOR IMPROVED DRIFT PERFORMANCE OF A GIMBALLED PLATFORM SYSTEM

BACKGROUND OF THE INVENTION

1. Field of the Invention

This invention relates to maintaining drift performance of a gimballed platform system and, more particularly, to detecting excessive drift and for compensating system control in accordance therewith.

2. Description of the Prior Art

Present means for detecting excessive drift of a gimballed platform system and for maintaining desired accuracy utilize voting apparatus requiring sensors mounted on the control axes. For example, more than two sensors per control axis are required for a single redundant system platform or one sensor per control axis for triple platform systems.

The device of the invention has the capability of handling multiple gyro excessive drift conditions without the excessive sensor hardware as aforenoted. The invention utilizes two platforms, each having three skewed gyros, and thus provides maximum system accuracy with minimum platform redundancy.

SUMMARY OF THE INVENTION

This invention contemplates apparatus including two gimballed platforms coupled in redundant configuration, each of which is controlled by three single degree of freedom gyros. The six gyro input axes are skewed relative to an orthogonal triad and projections of one input axis on any other input axis are realized. A separate torquing signal is applied to the torque generators of each of three of the six gyros, and which torquing signal is proportional to the angular pivot misalignment of the two platform inner gimbal references and proportional to the drift of the three remaining (free) gyros, plus the drift of the torqued gyro.

One object of this invention is to provide novel means for automatic failure detection and isolation of gyro out of drift performance utilizing error signals proportional to the misalignment of two platform inner gimbals as a measure of gyro drift status.

Another object of this invention is to provide means for automatically compensating the control of a gimballed platform system in order to maintain drift within the required accuracy by utilizing gyro drift measurements obtained by comparing gimbal pivot angular misalignment from two platforms.

Another object of this invention is to provide means for automatic failure detection and fault isolation of any two gyro out of tolerance drift performance conditions utilizing a maximum of six gyros.

Another object of this invention is to provide maximum drift accuracy with a minimum of redundant platforms.

The foregoing and other objects and advantages of this invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
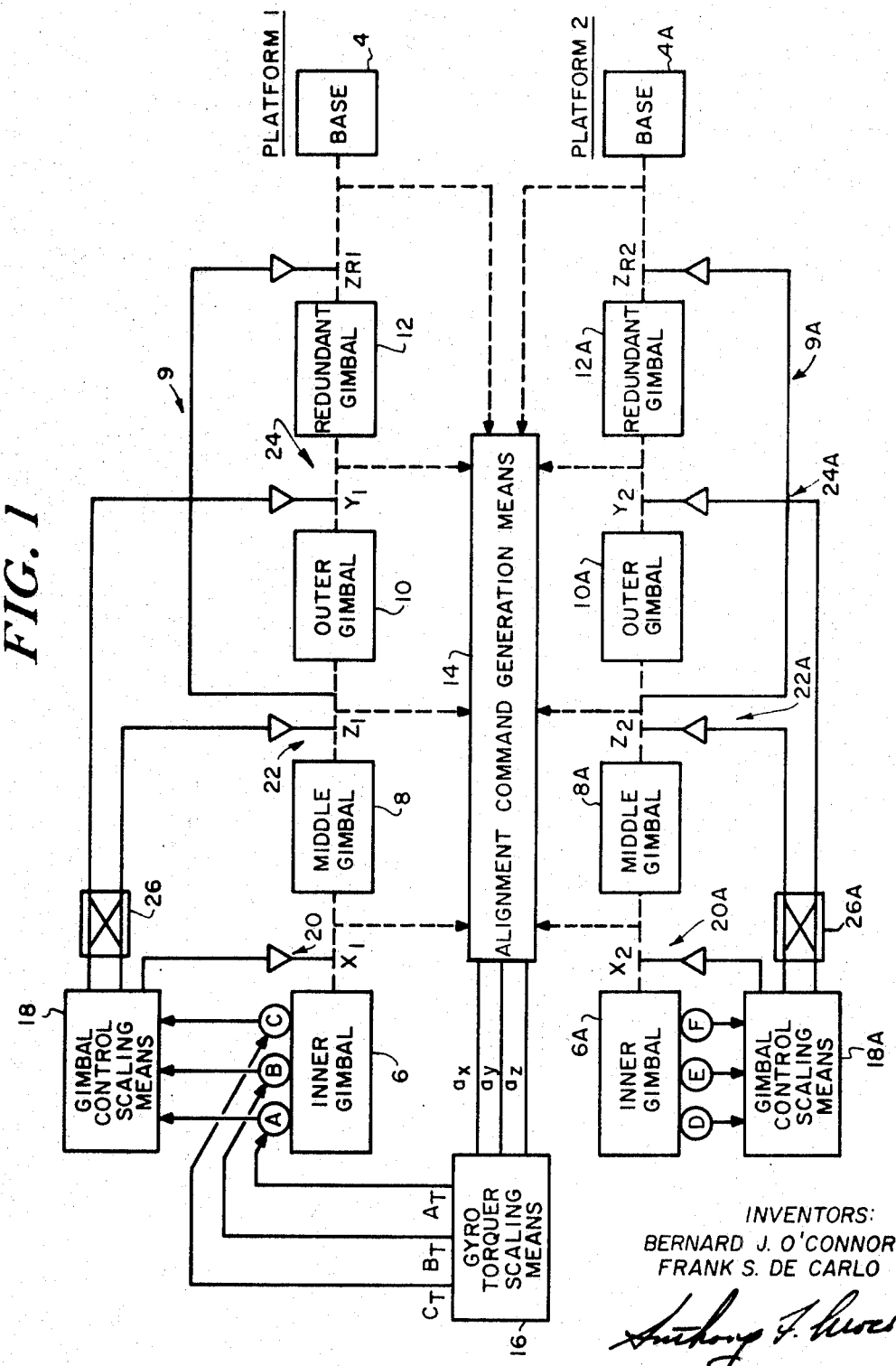
FIG. 1 is a functional block diagram of a system according to the invention.

With reference to FIG. 1, there is shown a system including two, four gimbal platforms designated by the numerals 1 and 2. Platform 1 includes a base 4, and inner gimbal 6, a middle gimbal 8, an outer gimbal 10 and a redundant gimbal 12. Platform 2 includes a a base 4A, an inner gimbal 6A, a middle gimbal 8A, an outer gimbal 10A and a redundant gimbal 12A. The respective inner, middle, outer and redundant gimbals of platforms 1 and 2 are coupled through pivots X, Z, Y, $Z_R$ in a conventional manner and redundant gimbals 12 and 12A are slaved to middle gimbals 8 and 8A through servo loops 9 and 9A, respectively, as will be understood by those skilled in the art.

Platform 1 is controlled by three single degree of freedom gyros designated as A, B, and C, and which gyros are supported by inner gimbal 6. Platform 2 is likewise controlled by three single degree of freedom gyros designated as D, E, and F, and which gyros are supported by inner gimbal 6A.

It is to be noted that the specific orientation of gyros A, B, and C and gyros D, E, and F is not of paramount importance. The only requirement which must be met is that the gyro axes be skewed relative to an orthogonal triad and that projections of one gyro input axis on any other gyro input axis are realized.

Figure 2:
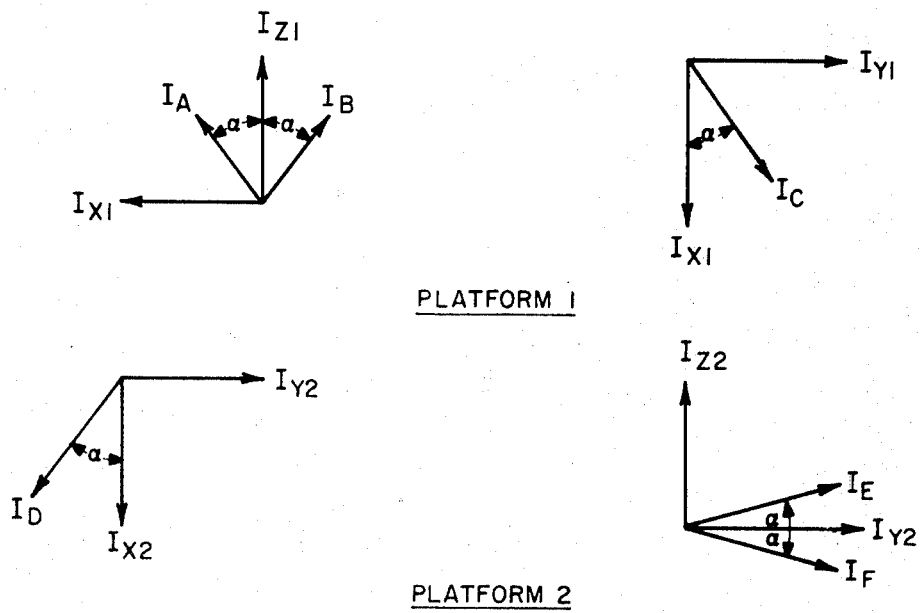
FIG. 2 is a graphical illustration showing the orientation of gyro axes relative to an orthogonal triad.

For purposes of illustration, a gyro orientation in accordance with the invention is shown in FIG. 2, wherein the gyro input axes for platform 1 are designated as $I_A$, $I_B$, and $I_C$ and the triad axes are designated as $I_{X1}$, $I_{Y1}$, and $I_{Z1}$. Likewise, the gyro input axes for platform 2 are designated as $I_D$, $I_E$, and $I_F$ and the triad axes are designated as $I_{X2}$, $I_{Y2}$, and $I_{Z2}$. The skew angle is designated as $\alpha$.

The inner gimbal orientation of platform 2 with respect to platform 1 is measured by comparing the respective pivot misalignment angles X, Y, Z, and $Z_R$ (FIG. 1). Alignment command generation means 14 utilizes the aforenoted misalignment angles to provide, for example, torquing command signals $a_X$, $a_Y$, and $a_Z$ for gyros A, B, and C. Since the gyro input axes are skewed relative to the inertial gimbal axes, the gyro sensed rates must be scaled in order to provide the appropriate inner gimbal rates for stabilization. This scaling is accomplished by gyro torquer scaling means 16, which may be of a configuration including three operational amplifiers for resolving gyro data into inner gimbal data, and which is responsive to alignment command signals $a_X$, $a_Y$, and $a_Z$ for providing torquing signals $A_T$, $B_T$, $C_T$ to torquers of gyros A, B, and C, respectively.

The torquing command signals are utilized to determine the drift status of the platform system. For example, suppose both platforms 1 and 2 contain ideal control gyros and that the inner gimbal coordinate axes are initially coincident with one another. For this condition the coordinate misalignment between the two stable elements is zero. Now, suppose five of the six gyros are ideal and one of the gyros, for example, gyro A, drifts. The drift of gyro A causes the gimbal axes of platform 1 to slowly diverge from the gimbal axes of platform 2 at a rate consistent with the drift error, thus providing angular misalignments between the respective X, Y, Z, and $Z_R$ pivots of each platform. With this condition, all similar platform pivot angles are compared and the resultant pivot error signals ($a_X$, $a_Y$, and $a_Z$) are appropriately scaled by scaling means 16 to provide torquing signals ($A_T$, $B_T$, and $C_T$) for torquing the torques of gyros A, B, and C, respectively.

The torquing signals for gyros B and C will be zero since these gyros were assumed ideal, and the torquing signal for gyro A will produce an electrical moment on the float of drifting gyro A in a sense to oppose the mechanical moment providing the drift. This torquing signal allows gyro A to generate effective X, Y, and Z inner gimbal signals which are applied as inputs to gimbal servo loops 20, 22, and 24. The gimbal servos will drive until the angular velocity of inner gimbal 6 matches the angular velocity of inner gimbal 6A, which in this case was assumed to be zero. The inner gimbal signals are applied through scaling means 18, which is similar to scaling means 16 heretofore described, and through a coordinate resolver 26 which may be a single speed resolver for transferring the data from a gyro coordinate system to an inner gimbal system, as will be understood by those skilled in the art.

The aforegoing example illustrates how angular misalignment between two inner gimbals is utilized to measure and compensate for the drift of one gyro, (gyro A). This example may be extended to at least two gyros simultaneously. Although the generation of command signals for gyros A, B, and C has been illustrated, similar command signals for gyros D, E, and F may be generated using scaling means 18A and 26A.

The alignment command signals that are required for the purpose of torquing combinations of three of six gyros simultaneously are generated by comparing the outputs of resolvers mounted on each platform pivot. The resolvers of platform 2, for example, are excited from a precision frequency source. The sine-cosine output from these resolvers are used to excite the resolvers of platform 1. The outputs of the sine winding from the resolvers represent the inner gimbal misalignment errors $\Delta \theta_X$, $\Delta \theta_Z$, $\Delta \theta_Y$, and $\Delta \theta_{ZR}$. These error signals are resolved using two coordinate resolvers, and appropriately summed to provide inner gimbal command signals $a_X$, $a_Y$, and $a_Z$. Equations 1, 2 and 3 describe the respective command signals in terms of $\theta$ and $\alpha$ (FIG. 2) as follows:

$$a_X = -[\Delta \theta_X + \Delta \theta_{ZR} \sin\alpha\theta_y] \quad (1)$$

$$a_Y = [\sin\alpha\ \theta_X(\Delta \theta_Z + \Delta\theta_{ZR} \cos\alpha\ \theta_Y) + \Delta\theta_Y \cos\alpha\ \theta_Y] \quad (2)$$

$$a_Z = -[-\Delta \theta_Y \sin\alpha\theta_X + \cos\alpha\ \theta_X(\Delta \theta_Z + \Delta \theta_{ZR} \cos \theta_Y)] \quad (3)$$

Figure 3:
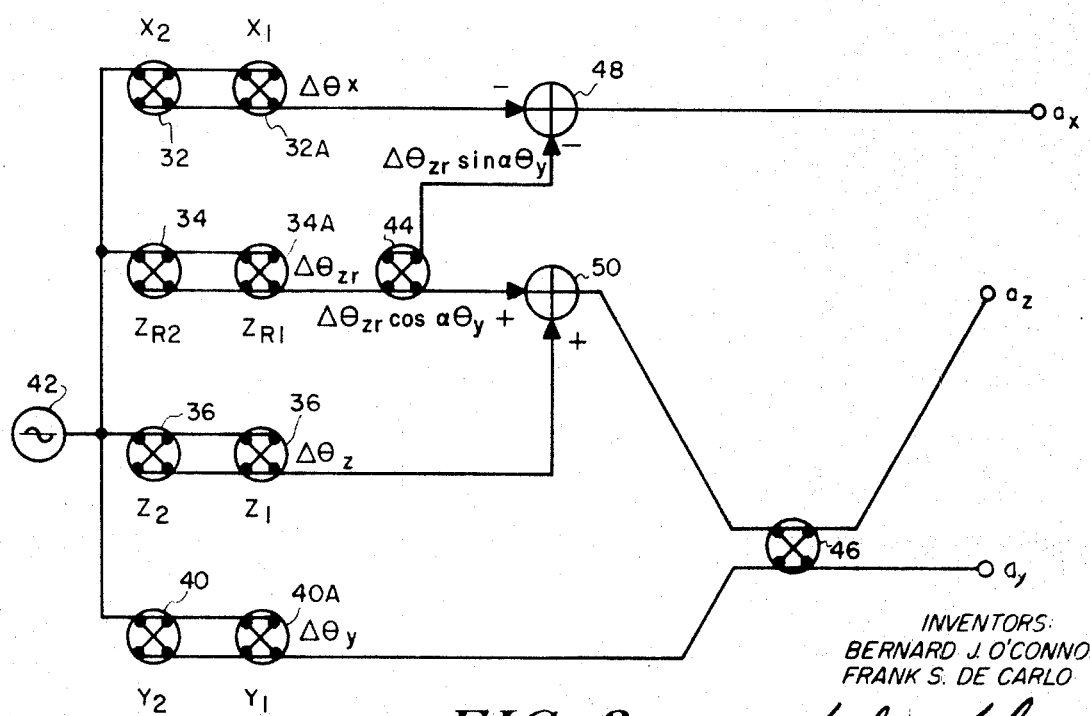
FIG. 3 is a schematic diagram for generating alignment command signals in accordance with the invention.

FIG. 3 shows a typical implementation of alignment command generation means 14 (FIG. 1). Although FIG. 3 shows the implementation for four gimbal platform, the concept may be extended to any number of gimbals as will now be understood by those skilled in the art.

Thus, alignment command generation means 14 includes resolvers 32, 34, 36 and 40 mounted on inner ($X_2$), middle ($Y_2$), outer ($Z_2$) and redundant ($Z_{R2}$) gimbals 6A, 8A, 10A and 12A, respectively, of platform 2 and excited from a precision frequency a.c. source 42. The sine-cosine outputs from the platform 2 resolvers are used to excite corresponding platform 1 resolvers 32A, 34A, 36A and 40A. The respective sine outputs from these latter resolvers represent the inner gimbal misalignment errors $\theta_X$, $\theta_Z$, $\theta_Y$ and $\theta_{ZR}$, respectively. These error signals are resolved using two coordinate resolvers 44 and 46 and appropriately summed by summing means 48 and 50 to provide inner gimbal command signals $a_X$, $a_Y$, $a_Z$ in accordance with equations (1), (2) and (3) as noted.

Torquer signals $A_T$, $B_T$, $C_T$ shown in FIG. 1 may be expressed as follows:

$$A_T = W_{IA2} \cdot \bar{I}_A + W_{At}$$
$$B_T = W_{IA2} \cdot \bar{I}_B + W_{Bt}$$
$$\quad (4)$$
$$C_T = W_{IA2} \cdot \bar{I}_C + W_{Ci-1}$$

With reference to FIG. 1, it is to be noted that in each case the torquer current is the sum of the total drift rate of inner gimbal 6 projected on the appropriate gyro input axis $\bar{I}_A$, $\bar{I}_B$, $\bar{I}_C$ plus the drift moment of the torqued gyro $W_{At}$, $W_{Bt}$, $W_{Ci}$. The torquer current of the constrained gyro is, by definition, a required failure detection or logic equation.

Thus, there are 15 groups of four gyros in a set of six gyros as shown in table 1 where logic "1" and logic "0" denote the presence and non-presence, respectively, of a gyro.

TABLE 1

Groups of Four Gyros from the Group $ABC_1 D_2EF$

| $ABC_1$ | $D_2EF$ | $ABC_1$ | $D_2EF$ |
|---|---|---|---|
| 111 | 100 | 101 | 011 |
| 111 | 010 | 100 | 111 |
| 111 | 001 | 011 | 110 |
| 110 | 110 | 011 | 101 |
| 110 | 101 | 011 | 011 |
| 110 | 011 | 010 | 111 |
| 101 | 110 | 001 | 111 |
| 101 | 101 | | |

If two failures are to be identified from the set of six gyros, then the 15 groups of four gyros must be considered and 15 logic equations are required.

The logic equations are obtained from operating platforms 1 and 2 in six different modes as shown in table 2. The free gyros are shown in the first column and the torqued or restrained gyros are defined in the third column.

TABLE 2

| Mode | Free Gyros | Torqued Gyros |
|---|---|---|
| 1 | ABE | $C_1D_2F$ |
| 2 | ABF | $C_1D_2E$ |
| 3 | $AC_1D_2$ | B E F |
| 4 | $BC_1D_2$ | A E F |
| 5 | $C_1EF$ | A B $D_2$ |
| 6 | $D_2EF$ | A B $C_1$ |

It is now assumed that the system is initially in mode 1, in this mode gyro AB and E are free and gyros CD and F are torqued. The functional relationship of the torquing currents in mode 1 is given by equations 5 as follows:

$$C_T = f(ABCE)$$
$$D_T = f(ABDE)$$

(5)

$$E_T = f(ABEF)$$

If an excessive torquer current is represented by logic "1" and an acceptable current by logic "0," if one of the torqued gyros fails (CD or F), only the torquer current associated with the failing gyro will be excessive. If gyro C fails, then by examining the functional dependence shown in equation 5, it can be seen that $C_T =$ "1," $D_T =$ "0" and $F_T =$ "0." Similar results occur for a D or F gyro failure. In the case of a D gyro failure $C_T =$ "0," $D_T =$ "1," $F_T =$ "0;" and for an F gyro failure, $C_T =$ "0," $D_T =$ "0," $F_T =$ "1."

However, if any of the free gyros fail (A, B, E) all torquer currents are excessive and no isolation is possible in this mode. Table 3 lists the mode states for all single gyro failures for the six operational modes of the system.

TABLE 3

| Mode | Torqued Gyros | Failed Gyros | | | | | |
|---|---|---|---|---|---|---|---|
| | | A | B | C | D | E | F |
| 1 | $C_T D_T F_T$ | 111 | 111 | 100 | 010 | 111 | 001 |
| 2 | $C_T D_T E_T$ | 111 | 111 | 100 | 010 | 001 | 111 |
| 3 | $B_T E_T F_T$ | 111 | 100 | 111 | 111 | 010 | 001 |
| 4 | $A_T E_T F_T$ | 100 | 111 | 111 | 111 | 010 | 001 |
| 5 | $A_T B_T D_T$ | 100 | 010 | 111 | 001 | 111 | 111 |
| 6 | $A_T B_T C_T$ | 100 | 010 | 001 | 111 | 111 | 111 |

Failure detection and isolation in accordance with the invention may be summarized by stating that if three "0"s are obtained in a given mode then all gyros are properly operating. If one or two "0"s are obtained the system will remain in that mode and the gyros which failed are identified. If three "1"s are obtained in a given mode then the system must switch to another mode and search for a "0." If none is found, it must search again until a "0" is found. If a search through all six modes produces no state with at least one "0," then a minimum of three failures has occurred.

There has thus been described means for automatic failure detection and fault isolation of gyro out of drift performance utilizing error signals proportional to the misalignment of two platform inner gimbals as the measure of drift status. Moreover, means are provided for automatically compensating the control of the platform system in order to maintain the drift within required tolerances by utilizing the gyro drift status measurement signal in order to compensate those gyros with excessive drift. Finally, the invention provides for automatic failure detection and fault isolation, wherein any two gyros with excessive drift conditions are isolated by using a maximum of six gyros.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A gimballed platform system, comprising:
a first gimballed platform;
a second gimballed platform coupled to the first platform in redundant configuration;
a first plurality of gyros supported by the first platform;
a second plurality of gyros supported by the second platform;
the input axes of the gyros in the first and second pluralities of gyros being skewed relative to an orthogonal triad;
means for providing signals corresponding to angular misalignment between said first and second platforms, said means including a plurality of resolvers mounted to one of said first and second platforms, a voltage source connected to the resolvers for exciting said resolver to provide outputs, and a plurality of resolvers mounted to the other of said first and second platforms and connected to corresponding resolvers in the first mentioned plurality of resolvers for being excited by the outputs therefrom to provide sine outputs corresponding to said angular misalignment; and
means connected to said last mentioned means and to the gyros in one of the first and second pluralities of gyros for controlling said gyros in response to the misalignment signals.

2. A gimballed platform system, comprising:
a first gimballed platform;
a second gimballed platform coupled to the first platform in redundant configuration;
a first plurality of gyros supported by the second platform;
each of the first and second gimballed platforms including a base, a redundant gimbal coupled to the base, an outer gimbal coupled to the redundant gimbal, a middle gimbal coupled to the outer gimbal and an inner gimbal coupled to the middle gimbal; the first plurality of gyros supported by the inner gimbal of the first platform and the second plurality of gyros supported by the inner gimbal of the second platform;
the input axes of the gyros in the first and second pluralities of gyros being skewed relative to an orthogonal triad;
means for providing signals corresponding to angular misalignment between said first and second platforms; and
means connected to said last mentioned means and to the gyros in one of the first and second pluralities of gyros for controlling said gyros in response to the misalignment signals.

3. A system as described by claim 2, wherein each of the inner, middle, outer and redundant gimbals of the first and second platforms has pivot means coupling it to an adjacent gimbal and the means for providing signals corresponding to angular misalignment between said first and second platforms includes:
resolvers for each of the inner, middle, outer and redundant gimbals of one of said first and second platforms and mounted to the respective gimbal pivot means;
a voltage source connected to the resolvers for exciting said resolvers to provide outputs; and
other resolvers for each of the inner, middle, outer and redundant gimbals of the other of the first and second platforms and mounted to the respective gimbal pivot means, and connected to corresponding resolvers of said one platform for being excited by the outputs therefrom to provide outputs corresponding to said angular misalignment.

4. A gimballed platform system, comprising:
a first gimballed platform;
a second gimballed platform coupled to the first platform in redundant configuration;
a first plurality of gyros supported by the first platform;
a second plurality of gyros supported by the second platform;
the first and second platforms including an inner gimbal, a middle gimbal, first pivot means for coupling the inner gimbal to the middle gimbal, an outer gimbal, second pivot means for coupling the middle gimbal to the outer gimbal, a redundant gimbal, third pivot means for coupling the middle gimbal to the redundant gimbal, a base, fourth pivot means for coupling the redundant gimbal to the base, the first plurality of gyros supported by the inner gimbal of the first platform and the second plurality of gyros supported by the inner gimbal of the second platform;
the input axes of the gyros in the first and second pluralities of gyros being skewed relative to an orthogonal triad;
means for providing signals corresponding to angular misalignment between said first and second platforms; and
means connected to said last mentioned means and to the gyros in one of the first and second pluralities of gyros for controlling said gyros in response to the misalignment signals.

5. A system as described by claim 4, wherein the means for providing signals corresponding to angular misalignment between said first and second platforms includes:
resolvers mounted to each of the first, second, third and fourth pivot means of the first and second platforms;
means connected to the resolvers on the first and second platforms for comparing corresponding resolver outputs to provide inner gimbal misalignment command signals; and
means connected to the comparing means and responsive to the command signals for providing inner gimbal error signals.

6. A system as described by claim 5, including:
scaling means connected to the command signal means for providing torquing signals in response to the error signals; and
one of the first and second plurality of gyros being connected to the scaling means for torquing the gyros in response to the torquing signals whereby at least one gyro in said one plurality of gyros generates an electrical moment in a sense to oppose a mechanical moment providing the inner gimbal misalignment.

7. A system as described by claim 6, including:
a first servo loop connecting the one plurality of gyros to the first pivot means;
a second servo loop connecting the one plurality of gyros to the second pivot means;
a third servo loop connecting the one plurality of gyros to the third pivot means; and
said first, second and third servo loops being responsive to the electrical moment generated by the one gyro for driving the first platform until the angular velocity of the inner gimbal of said first platform matches the angular velocity of the inner gimbal of the second platform.

8. A system as described by claim 7, including:
other scaling means for connecting the first, second and third servo loops to the one plurality of gyros.

9. A system as described by claim 4, wherein each of the first and second platforms includes:
a servo loop for coupling the second pivot means to the fourth pivot means for slaving the middle gimbal to the redundant gimbal.

10. A gimballed platform system, comprising:
a first platform including an inner gimbal, a middle gimbal supporting the inner gimbal, an outer gimbal supporting the middle gimbal, a redundant gimbal supporting the outer gimbal and a base supporting the redundant gimbal;
a second platform including an inner gimbal, a middle gimbal supporting the inner gimbal, an outer gimbal supporting the middle gimbal, a redundant gimbal supporting the outer gimbal and a base supporting the redundant gimbal;
a first group of three gyros supported by the inner gimbal of the first platform, said gyros having their input axes skewed relative to an orthogonal triad;
a second group of three gyros supported by the inner gimbal of the second platform, said gyros having their input axes skewed relative to an orthogonal triad;
means connected to the gimbals of said platforms for comparing the alignments of corresponding gimbals and for providing error signals corresponding to the misalignment thereof;
means connected to the comparing means for providing torquing signals in response to the error signals for torquing at least one gyro in one of the first and second groups of gyros; and
the one gyro being torqued by said signals for providing an electrical moment in a sense to oppose a mechanical moment providing said misalignment.

* * * * *